(12) United States Patent
Serban

(10) Patent No.: US 11,889,019 B2
(45) Date of Patent: Jan. 30, 2024

(54) CATEGORIZING CALLS USING EARLY CALL INFORMATION SYSTEMS AND METHODS

(71) Applicant: T-Mobile USA, Inc., Bellevue, WA (US)

(72) Inventor: Ovidiu Cristian Serban, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 80 days.

(21) Appl. No.: 17/499,587

(22) Filed: Oct. 12, 2021

(65) Prior Publication Data

US 2023/0113015 A1    Apr. 13, 2023

(51) Int. Cl.
| | |
|---|---|
| *H04M 3/436* | (2006.01) |
| *H04L 65/1069* | (2022.01) |
| *H04M 3/51* | (2006.01) |
| *H04L 65/1104* | (2022.01) |

(52) U.S. Cl.
CPC ........ *H04M 3/436* (2013.01); *H04L 65/1069* (2013.01); *H04L 65/1104* (2022.05); *H04M 3/5175* (2013.01)

(58) Field of Classification Search
CPC . H04M 3/436; H04M 3/5175; H04L 65/1104; H04L 65/1069
USPC .......................................................... 370/259
See application file for complete search history.

(56) References Cited

U.S. PATENT DOCUMENTS

| | | | |
|---|---|---|---|
| 7,042,871 B2 | 5/2006 | Gallant et al. | |
| 7,203,305 B1 | 4/2007 | Hajj et al. | |
| 7,593,904 B1 | 9/2009 | Kirshenbaum et al. | |
| 7,974,212 B2 | 7/2011 | Leung et al. | |
| 8,150,011 B2 | 4/2012 | Mcconnell et al. | |
| 8,275,102 B2 | 9/2012 | Zheng et al. | |
| 8,358,749 B2 | 1/2013 | Chang et al. | |
| 8,374,334 B2 | 2/2013 | Sankaranarayanan | |
| 8,384,756 B2 | 2/2013 | Goffin | |
| 8,687,794 B1 | 4/2014 | Spievak et al. | |
| 8,913,493 B2 | 12/2014 | Haltom | |
| 9,049,287 B2 | 6/2015 | Masters | |

(Continued)

FOREIGN PATENT DOCUMENTS

| | | |
|---|---|---|
| CN | 1820474 A | 8/2006 |
| KR | 100704828 B1 | 4/2007 |

(Continued)

*Primary Examiner* — Ahmad F. Matar
*Assistant Examiner* — Jirapon Tulop
(74) *Attorney, Agent, or Firm* — Perkins Coie LLP

(57) ABSTRACT

Systems and methods for categorizing received calls based on early call information are disclosed. Early call information can be audio, video, other sensor data, or other data collected via a calling device during call setup or any time before the call is routed to or accepted at a receiving device. A call and early call information associated with the call are received. A call characteristic, which can be a purpose or topic of the call, is identified using the early call information. Based on the call characteristic, the received call is categorized and a relative priority for the call is assigned. The call can be routed based on the early call information, and a suggested response to the call can be identified. In some implementations, a machine learning model is trained to categorize received calls based on early call information.

20 Claims, 5 Drawing Sheets

(56) References Cited

U.S. PATENT DOCUMENTS

| | | |
|---|---|---|
| 9,171,322 B2 | 10/2015 | Spievak et al. |
| 9,591,464 B2 | 3/2017 | Jawaharlal et al. |
| 9,628,611 B2 | 4/2017 | Zampiello et al. |
| 9,641,680 B1 | 5/2017 | Wold |
| 9,781,261 B2 | 10/2017 | Jain et al. |
| 9,936,066 B1 | 4/2018 | Mammen et al. |
| 10,146,919 B1 | 12/2018 | Osborne et al. |
| 10,284,720 B2 | 5/2019 | Kent et al. |
| 10,339,456 B2 | 7/2019 | Hui et al. |
| 10,379,995 B1 | 8/2019 | Walters et al. |
| 10,455,438 B2 | 10/2019 | Bisada |
| 10,484,532 B1 | 11/2019 | Newman et al. |
| 10,558,809 B1 | 2/2020 | Joyce et al. |
| 10,666,792 B1 | 5/2020 | Marzuoli et al. |
| 10,694,026 B2 | 6/2020 | Chandrasekaran et al. |
| 10,764,229 B2 | 9/2020 | Chou et al. |
| 10,789,956 B1 | 9/2020 | Dube |
| 10,841,424 B1 | 11/2020 | Lemus et al. |
| 10,880,439 B2 | 12/2020 | Scivicque et al. |
| 10,938,982 B1 | 3/2021 | Merchant et al. |
| 10,951,770 B2 | 3/2021 | Haltom et al. |
| 10,984,430 B2 | 4/2021 | Jain et al. |
| 11,032,418 B2 | 6/2021 | Feuz et al. |
| 11,037,576 B2 | 6/2021 | Baughman et al. |
| 11,042,647 B1 | 6/2021 | Joyce et al. |
| 2007/0121595 A1 | 5/2007 | Batni et al. |
| 2009/0257566 A1 | 10/2009 | Dixon |
| 2010/0135470 A1 | 6/2010 | Bishop |
| 2014/0044017 A1* | 2/2014 | Haltom .............. H04M 3/5166 379/207.02 |
| 2016/0330596 A1* | 11/2016 | Jawaharlal ............ H04M 3/436 |
| 2018/0013881 A1* | 1/2018 | Cooper ................. H04M 3/493 |
| 2018/0103146 A1 | 4/2018 | Choe et al. |
| 2018/0262614 A1* | 9/2018 | Drake ................... H04M 15/61 |
| 2018/0295234 A1* | 10/2018 | Kumar Selvaraj ......................... H04L 65/1059 |
| 2019/0087747 A1 | 3/2019 | Kapoor et al. |
| 2020/0073895 A1 | 3/2020 | Vira et al. |
| 2020/0358901 A1* | 11/2020 | Matias ................... G06N 20/00 |
| 2020/0410378 A1 | 12/2020 | Williams et al. |
| 2021/0058507 A1 | 2/2021 | Cornwell et al. |
| 2021/0152693 A1* | 5/2021 | Edwards ............ H04M 3/5232 |
| 2022/0303388 A1* | 9/2022 | Shvetsov ............... G06N 20/10 |

FOREIGN PATENT DOCUMENTS

| | | |
|---|---|---|
| WO | 2016189350 A1 | 12/2016 |
| WO | 2018068096 A1 | 4/2018 |

* cited by examiner

CATEGORIZING CALLS USING EARLY CALL INFORMATION SYSTEMS AND METHODS

BACKGROUND

Call setup can include various processes for establishing communications between parties, such as using Session Initiation Protocol (SIP) or other protocols for establishing communications. Communications can include, for example, audio and/or video calls using various devices, such as telephones, mobile devices, laptop or desktop computers, tablets, wearable devices, and so forth. Calling and receiving devices exchange data and/or media, such as audio information, visual information, and other data collected via the devices. Calls are sent and received via various networks, such as telecommunications networks and/or the internet.

BRIEF DESCRIPTION OF THE DRAWINGS

Detailed descriptions of implementations of the present invention will be described and explained through the use of the accompanying drawings.

Figure 1:
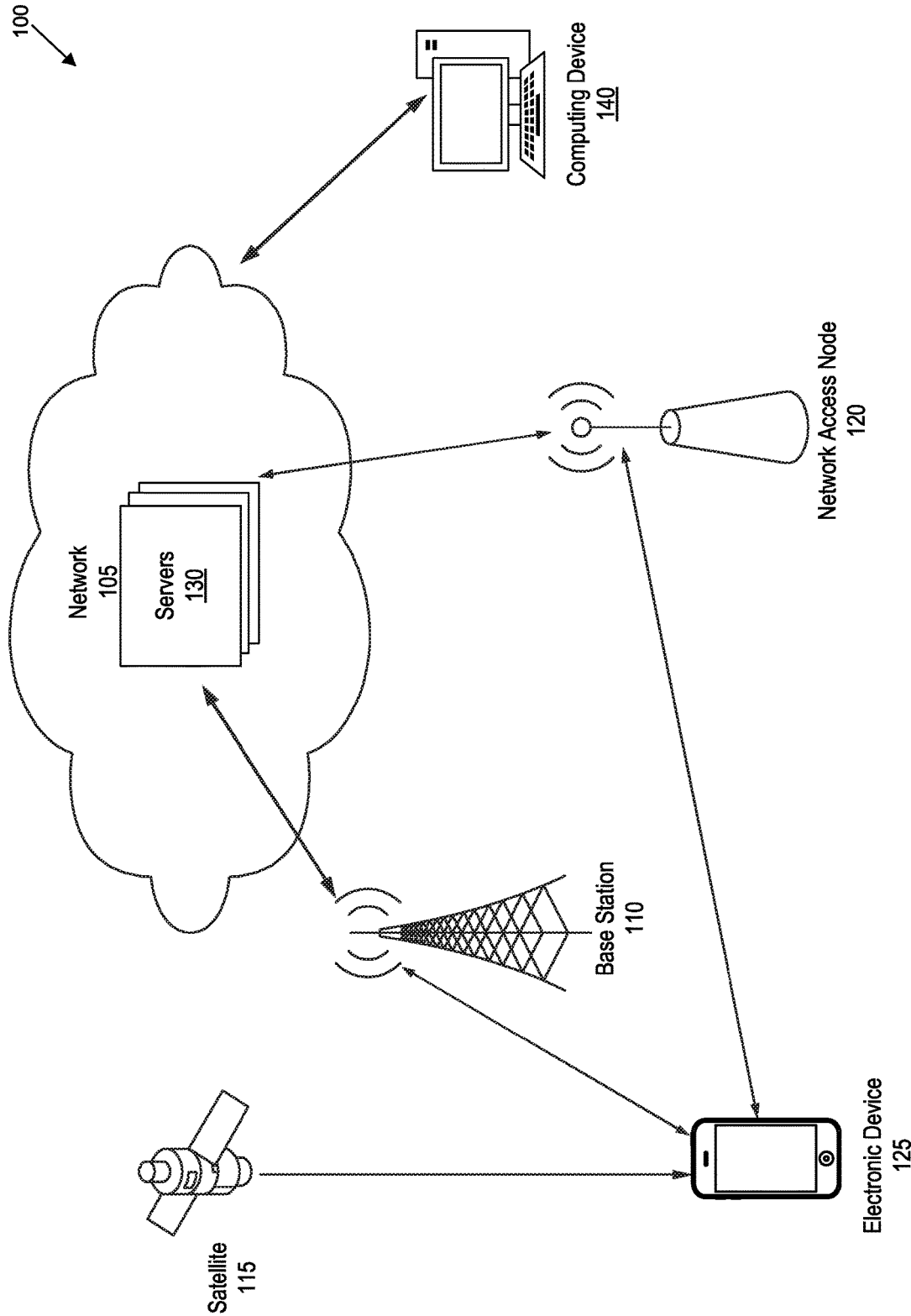
FIG. 1 is a block diagram illustrating a suitable computing environment within which a system for categorizing calls using early call information operates.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Typically, a call recipient receives very little information about a call during call setup and/or before the recipient accepts the call. For example, when a phone call is made by a calling device, the call is routed to a receiving device and the receiving device will ring or otherwise prompt the recipient to answer. The receiving device can display limited information such as a phone number of the caller and a name of the caller (if known). If the caller is known to the recipient (e.g., included in a contact list of the receiving device), limited identifying information can be available, such as a custom ringtone and/or a stored photograph associated with the caller. Information about a location associated with the caller can also be available. In addition, profile information associated with a caller can sometimes be available, as described in the Applicant's U.S. Pat. No. 10,778,836, entitled "ENHANCED USER PROFILE INFORMATION DISPLAY ON TERMINATING HANDSET." But the recipient typically must answer the call before richer information can be received. Only upon accepting a call, for example, can the recipient receive call audio and confirm the identity of the caller, find out what the call is about, receive information or media from the caller, and so forth.

Electronic devices, such as mobile devices, can include or be coupled to various sensors to collect information, such as microphones or other audio sensors to collect audio information, cameras or other visual sensors to collect visual information (e.g., photos or video), motion-sensitive sensors (e.g., accelerometers, gyroscopes, etc.), light-sensitive sensors (e.g., photodiodes), touch-sensitive sensors (e.g., touch-screens), biometric sensors, thermometers, hygrometers, and so forth. When a calling device places a call or other communication (e.g., short message service (SMS) or rich communication service (RCS) message) to a receiving device (e.g., a voice or video call), typically the information collected by sensors of the calling device only becomes available (if at all) to the receiving device after a user of the receiving device accepts the call or other communication. For example, when a video call is placed, the call recipient begins receiving audio and video collected via the calling device only when the recipient accepts the call.

However, in many situations, it would be advantageous to receive early call information, such as sensor data collected at a calling device before or during call setup. Early call information can include, for example, audio information, visual information (e.g., photos or video), ambient information, or other information associated with a calling device and collected and/or transmitted any time before a call or other communication is routed to or accepted at a receiving device. For example, providing early call information can help a public safety answering point (PSAP) better respond to received emergency calls. Receiving early call information could also assist, for example, with customer service communications by helping to route a call or other communication to an appropriate recipient to respond to a customer before the customer explains the reason for his or her inquiry. In addition, early call information can help a user of a mobile device to decide whether to answer a call, respond with a text, let the call go to voicemail, and so forth.

Accordingly, there is a need for a solution that overcomes the foregoing technical problems and provides other benefits. For example, there is a need for a technical solution that can receive early call information and categorize received calls using the early call information.

Disclosed herein are systems and related methods for categorizing received calls using early call information ("system" or "call categorization system"). The disclosed system can be provided by, for example, a telecommunication service provider using one or more nodes/servers of a network or networks associated with the service provider. Additionally or alternatively, the system can be provided by a service provider, such as a business, non-profit, or governmental entity that responds to calls. Portions of the system can be implemented, for example, using one or more mobile devices associated with callers and call recipients, such as via a software application. Using the disclosed system, a phone call can be received from a calling device that includes sensors, such as a microphone and a camera. Before the call is received by and/or routed to a receiving device, the system receives early call information, including information collected via the sensors of the calling device and/or sensors in the vicinity of the calling device. Based on the early call information, the system determines one or more categories for the call. A call category is determined using one or more call characteristics based on the early call information and/or other call data. Examples of categorizing calls include, but are not limited to, categorizing based on a topic or purpose associated with the call, keywords or phrases in the early call information, objects detected in an image included in the early call information, other sensor data, and so forth. Determining the category for the call can be performed, for example, using a trained machine learning model, such as a machine learning model that generates confidence scores reflecting a likelihood that early call information is associated with each of a set of call categories. Based on the determined call category, one or more actions can be taken, such as routing the call to a recipient, assigning a relative priority for responding to the call, and/or suggesting a response to the call.

The disclosed system also trains one or more machine learning models to perform operations for categorizing received calls based on early call information. For example, the system can receive/access call data for multiple calls, including early call information associated with the calls. The early call information includes sensor data (e.g., audio and/or visual data) associated with the calls. The call data can further include categories associated with calls, such as emergency calls, non-emergency calls, personal calls, business calls, telemarketing calls, and so forth. Call categories can also be more specific, such as certain categories of emergency calls (e.g., fire, violent crime, nonviolent crime, medical emergency, non-urgent, false reports or mistaken calls, etc.). Using the call data, the disclosed system generates a training dataset. Generating the training dataset includes, for example, identifying characteristics of calls based on early call information and/or other call data. For example, call characteristics can include keywords or phrases detected in audio information, objects detected in visual information, other sensor data collected via a calling device and/or a device coupled to the calling device (e.g., from a thermometer, hygrometer, photodiode, accelerometer, gyroscope, etc.), and so forth. In some implementations, call characteristics can further be based on other call data, such as phone numbers or other identifiers, location information, carrier information, call history, contact lists, and/or other information associated with callers and/or call recipients. Identifying call characteristics can include calculating values of variables based on the early call information and/or other call data, such as count or frequency variable values. Using the training dataset, the disclosed system trains one or more machine learning models to categorize received calls based on early call information.

For purposes of illustration, the present disclosure describes using the disclosed system to categorize received phone calls, such as emergency phone calls, based on early call information associated with a calling device. However, those skilled in the art will understand that the present technology can be applied in any situation where it would be advantageous to send and/or receive early call information, and to take actions based on the early call information. For example, the disclosed technology can be applied to calls other than phone calls, such as calls made via video conferencing services or radio-based communications. In addition, the disclosed technology can be applied to allow for exchange of early call information from a receiving device to a calling device and/or two-way or multiparty exchanges of early call information. Furthermore, the disclosed technology can be applied to other kinds of communications, such as SMS, RCS, and/or text message communications.

Advantages of the disclosed technology included earlier and more accurate categorization of calls. For example, existing systems, such as emergency call systems, typically have only limited information to categorize a call before the call is answered and the caller begins speaking, such as a caller phone number and location. Furthermore, the disclosed technology can categorize and prioritize calls more accurately because the system assesses earlier and richer data, beyond call audio received after a call is answered, such as visual information and other sensor information. In addition, the disclosed technology allows for faster and more efficient allocation of resources in response to a received call. For example, an emergency call can be categorized based on earlier and more complete information, which allows a dispatcher to generate an emergency response faster and more efficiently, based on the needs of the caller.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Suitable Environments

FIG. 1 is a block diagram illustrating a suitable environment 100 within which a system for categorizing received calls using early call information operates. The environment 100 includes one or more networks 105, including telecommunications networks, accessed by subscribers via electronic devices 125. Electronic devices 125 can include, without limitation, mobile devices or other user equipment (UE) associated with subscribers, such as smartphones or other mobile phones, tablet computers, laptop computers, desktop computers, wearable devices, and so on. Electronic devices 125 include or are coupled to sensors, such as microphones, cameras, accelerometers, gyroscopes, hygrometers, thermometers, touch-sensitive sensors, biometric sensors, and so forth. In some implementations, electronic devices 125 can include multiple coupled devices, such as a mobile device coupled to one or more accessory devices (e.g., smartwatches, smart glasses, clothing, medical devices, etc.). The networks 105 can include wired or wireless, public or private, networks including, for example, the internet. At least a portion of the networks 105 comprise one or more telecommunications networks provided by a telecommunications service provider having subscribers associated with electronic devices 125. To provide features of the network, telecommunications service providers use one or more servers 130.

Subscribers use electronic devices 125 to access the networks 105 via base stations 110, network access nodes 120, and/or satellites 115. A base station is a type of network access node (NAN) that can also be referred to as a cell site, a base transceiver station, or a radio base station. The environment 100 can include any combination of NANs including an access point, radio transceiver, gNodeB (gNB), NodeB, eNodeB (eNB), Home NodeB or eNodeB, or the like. In addition to a WWAN base station, a NAN can be a WLAN access point, such as an Institute of Electrical and Electronics Engineers (IEEE) 802.11 access point.

Electronic devices 125 are used to send and receive calls (e.g., telephone calls or video calls), texts or other messages (e.g., Short Message Service (SMS) or Rich Communication Services (RCS) messages), and other data via networks 105.

The environment 100 further includes one or more computing devices 140, at which calls (e.g., calls from electronic devices 125) can be received. Computing devices 140 can be any device capable of making and/or receiving a phone call or other communication (e.g., voice call, video call, etc.), such as a mobile device, a landline telephone, a laptop or desktop computer, a tablet, and so forth. In an example implementation, computing devices 140 can be associated with a public safety answering point (PSAP) or other facility for receiving calls, and computing devices 140 can include one or more computers where a dispatcher receives and responds to incoming calls (e.g., using telephonic communication technologies).

In an example use case, a caller associated with an electronic device 125 places an emergency phone call via network 105. Before the call is received and answered via a computing device 140 of a PSAP, the disclosed system begins receiving early call information associated with the electronic device 125. For example, the electronic device 125 can begin transmitting, to the call categorization system, audio collected via a microphone included in the electronic device 125 and/or photos or video collected via a camera included in the electronic device 125. In some implementations, the early call information includes other sensor data collected via the electronic device 125. For example, the call categorization system can receive heartrate information collected via the electronic device 125 (e.g., using a smartwatch coupled to a mobile device), and this heartrate information can indicate a likely medical emergency because the caller is exhibiting an irregular heartbeat. Additionally or alternatively, the early call information can include sensor data from an accelerometer included in electronic device 125, which can indicate that electronic device 125 recently registered a rapid acceleration (e.g., associated with an automobile accident or other impact). Using the received early call information, the call categorization system determines a category for the received call and takes one or more actions based on the determined category. The one or more actions can include for example, routing the received call to an appropriate computing device 140, based on the anticipated needs of the caller. For example, the call can be routed to a computing device 140 of a PSAP for responding to fires, medical emergencies, violent crimes, or non-violent crimes, depending on the determined call category. The one or more actions can additionally or alternatively include assigning a relative priority for the received call based on the determined call category. For example, if the early call information indicates a non-urgent call category (e.g., rescuing a cat trapped in a tree) then the call may be assigned a lower relative priority for response, as compared to a different call that is categorized as being associated with a violent crime or medical emergency.

FIG. 1 and the discussion herein provide a brief, general description of a suitable environment 100 in which the call categorization system can be supported and implemented. Although not required, aspects of the system are described in the general context of computer-executable instructions, such as routines executed by a computer, e.g., a mobile device, a server computer, or a personal computer. The system can be practiced with other communications, data processing, or computer system configurations, including: internet appliances, handheld devices (including tablet computers and/or personal digital assistants (PDAs)), Internet of Things (IoT) devices, all manner of cellular or mobile phones, multi-processor systems, microprocessor-based or programmable, consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet-switched, circuit-switched, or other scheme). Portions of the system can reside on a server computer, while corresponding portions can reside on a client computer such as a mobile or portable device, and, thus, while certain hardware platforms are described herein, aspects of the system are equally applicable to nodes on a network. In alternative implementations, the mobile device or portable device can represent the server portion, while the server can represent the client portion.

In some implementations, one or more of the electronic devices 125 and/or cell sites associated with a telecommunications network accessed by the electronic devices 125 can include network communication components that enable the devices to communicate with remote servers or other portable electronic devices by transmitting and receiving wireless signals using a licensed, semi-licensed, or unlicensed spectrum over a communications network, such as networks 105. In some cases, the networks 105 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the electronic device is configured to operate and switch among multiple frequency bands for receiving and/or transmitting data.

Call Categorization System

Figure 2:
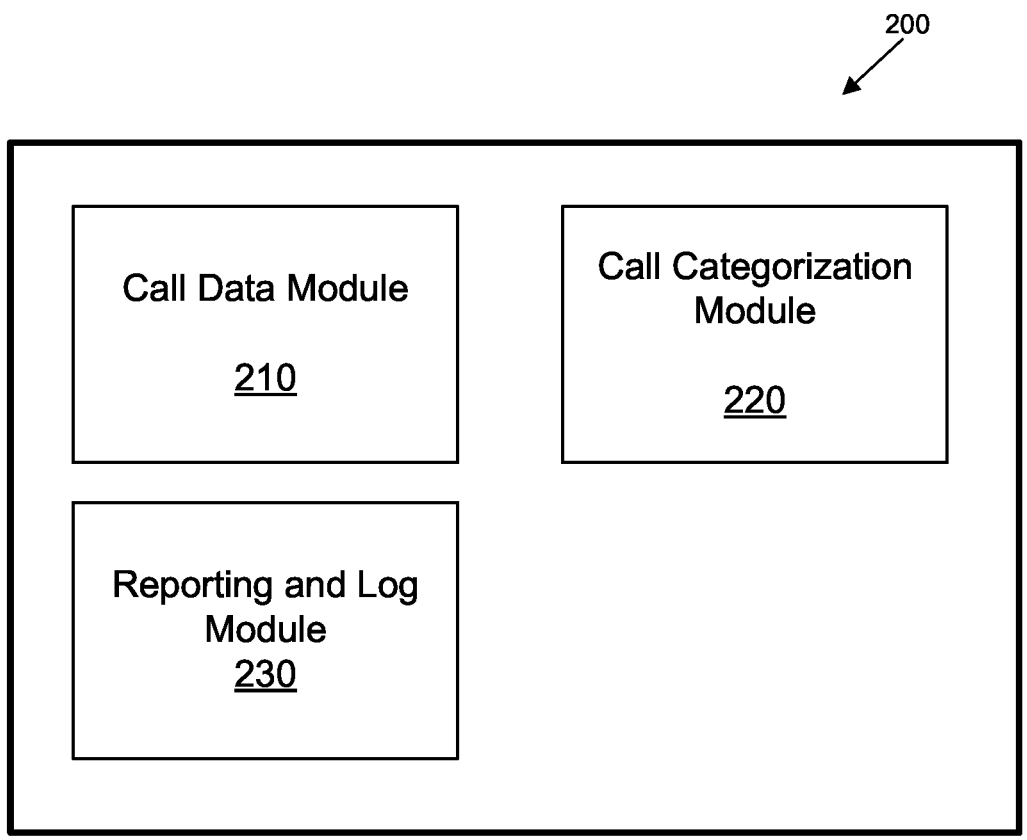
FIG. 2 is a block diagram illustrating components of a system for categorizing calls using early call information.

FIG. 2 is a block diagram illustrating components of a call categorization system 200 that categorizes received calls based on early call information. All or portions of the system 200 can be provided, for example, via a service provider, such as a business, non-profit, or governmental entity that assists with responding to received calls using computing devices 140 and/or associated servers (not shown) upon which all or portions of the system 200 can reside. The system 200 can additionally or alternatively be provided by a telecommunications service provider that provides the network 105 using one or more servers 130 upon which all or portions of the system 200 can reside. Additionally, portions of the system 200 can reside on electronic devices 125 associated with subscribers of the telecommunications service provider, such as using one or more software applications on electronic devices 125.

The call categorization system 200 can include functional modules that are implemented with a combination of software (e.g., executable instructions or computer code) and hardware (e.g., one or more memories and one or more processors). Accordingly, as used herein, in some examples a module is a processor-implemented module or set of code, and represents a computing device having a processor that is at least temporarily configured and/or programmed by executable instructions stored in memory to perform one or more of the functions described herein. For example, the call categorization system 200 can include a call data module 210, a call categorization module 220, and a reporting and log module 230, which are each discussed separately below.

Call Data Module

The call data module 210 is configured and/or programmed to receive/store/process data associated with phone calls or other communications. Call data can include a variety of data or metadata associated with calls, such as call detail records (CDRs), call logs, audio information (e.g., recorded or transcribed call audio), and/or visual information (e.g., photos or video associated with calls). As described herein, in some implementations, the disclosed system can additionally or alternatively be applied other kinds of communications, such as SMS, RCS, and/or text messages. In these and other implementations, data stored by the call data module 210 can include data associated with such communications, such as message text, sender and recipient information (e.g., identifiers, location information, device information), media, and so forth.

At least a portion of the call data comprises early call information. As described herein, the early call information includes any information collected and/or received before a call or other communication is routed to and/or received by a receiving device, such as sensor data collected via a calling device. The early call information can be collected/received, for example, during or before call setup. In some implementations, the early call information can be associated with a fixed time period before a call is accepted at a received device (e.g., one minute, five minutes, ten minutes, etc.). The sensor data can include audio information and/or visual information, including photos and/or video collected via a camera included in a calling device or communicatively coupled to the calling device (e.g. in a wearable device). In some implementations, the sensor data can additionally or alternatively include data collected via one or more other sensors, such as accelerometers, gyroscopes, photodiodes, touch-sensitive surfaces (e.g., touchscreens), biometric sensors, oxygen sensors, magnetic field sensors, and so forth. In these and other implementations, sensor data can further include temperature (e.g., ambient or body temperature), altitude, humidity, oxygen levels, proximity information (e.g., proximity of a device to a second location), and so forth. In some implementations, early call information can include non-sensor data associated with a device, such as user identifying information, identifiers, ambient information (e.g., whether the device is in a mall, at home, in a park, near a body of water, etc.). Other non-sensor data can include, for example, device information including availability of codecs/compression mechanisms, negotiated audio or video codecs/compressions, operating system information, application information, location information, activated wireless connection types (e.g., WiFi, cellular, etc.), nearby connected devices, connected wireless radios, processor information, device integrity status (e.g., compromised or uncompromised), and so forth.

As described herein, call data and/or early call information associated with calls can be used to train, by the call categorization module 220, one or more machine learning models to categorize received calls using early call information. To facilitate training of machine learning models, the call data module 210 can process call data and/or early call information in various ways. For example, call data and associated early call information can be associated with or assigned to one or more of a set of categories. Call categories can include various categories associated with calls, such as emergency calls, non-emergency calls, business-related calls, personal calls, sales calls, telemarketing calls, nuisance calls and so forth. Additionally or alternatively, call categories can include narrower call categories, such as specific categories of emergency calls, including medical emergency calls, fire emergency calls, violent crime calls, non-violent crime calls, non-urgent emergency calls, false reports or mistaken calls, active crime calls (e.g., about a crime presently in progress), inactive crime calls (e.g., to report a crime that occurred in the past), and so forth.

In addition, sensor data included in call data and/or early call information can be processed to identify one or more characteristics of a call. These characteristics can, in turn, be used to identify topics or purposes of a call that are indicative of call categories. For example, recorded or transcribed call audio can be processed to identify characteristics based on audio content. Audio characteristics can be based on keywords or phrases spoken during the call, such as words indicating the topic or purpose of the call. Early call information associated with a call can include audio of a caller talking about the reason for the call, and the caller may use one or more keywords or phrases in describing the reason for the call. If the call is about a violent crime, the caller may use words such as "gun," "shooter," "stab," "robbery," "assault," "hurt," and so forth. If the call is about a medical emergency or an accident, the caller may use words associated with a medical problem, such as "heart attack," "can't breathe," "need an ambulance," "car accident," "fall," "hot," "cold," "pressure," "drown," "choke," and so forth.

Call audio can also be processed to identify one or more other characteristics, for example, based on non-verbal sounds, tone of voice, ambient noise, background noise or sounds, rate of speaking, volume, and so forth. For example, audio information included in early call information can be analyzed to identify noises indicating a person in distress, based on groans, screams, cries, and so forth. Additionally or alternatively, the audio information can be analyzed to identify sounds such as gunshots, sudden impacts (e.g., car crashes), fire-related sounds, water-related sounds, and so forth. In addition, audio information can be analyzed to identify likely sentiment, mood, or tone of voice of a speaker, which may indicate whether a caller is in distress (e.g., speaking quickly or with a distressed tone of voice), calm (e.g., speaking normally or slowly), angry (e.g., shouting), incapacitated, and so forth. Additionally or alternatively, audio information can be analyzed for indications that a person is having difficulty speaking, for example, because the person is responding to external conditions (e.g., drowning, distressed, confined, etc.) or is experiencing a physical or mental impairment (e.g., stroke, heart attack, injury, etc.).

Additionally or alternatively, visual information associated with call data and/or early call information can be processed to identify call characteristics. For example, photos and/or video included in early call information can be processed using computer vision techniques and/or other visual processing operations to identify one or more objects in an image or video. These objects might include, for example, an injured person, an uninjured person, a wound or injury, an animal (e.g., an injured animal, an attacking animal, or a trapped animal), a weapon (e.g., a knife or a gun), a vehicle (e.g., a damaged vehicle, which may be associated with a car accident), a fire, water or other liquids, smoke, snow, ice, and so forth. Visual processing operations applied to photos and/or video can include image comparison, velocity operations, chromatic operations, multispectral and/or statistical classification, image capturing, and so forth.

In some implementations, early call information and/or other call data associated with other sensors can be processed to identify call characteristics. For example, temperature information can be analyzed for characteristics about a caller's environment, wherein a low temperature can indicate an outdoor environment, a room temperature can indicate an indoor environment, or an unusually high temperature can indicate an emergency situation (e.g., because the caller is close to a fire). Data from motion-sensitive sensors, such as gyroscopes or accelerometers, can be analyzed to indicate a sudden impact, which may be associated with a fall, a car accident, or similar occurrence. Data from biometric sensors, such as a heart monitor worn by a caller, can be analyzed to detect whether a caller is likely to be experiencing a medical emergency (e.g., because the caller has a faint or irregular heartbeat), or based on body temperature, oxygen level, expired air composition, analysis of eye focus, and so forth. In addition, sensor data can be analyzed to detect sudden changes in conditions (e.g., temperature, humidity, moisture, noise level, etc.).

The foregoing characteristics and other characteristics associated with early call information can be identified or expressed based on one or more calculated variable values, such as variable values expressing counts or frequencies (e.g., count or frequency of keywords or phrases, count or frequency of irregular heartbeats, count or frequency of gunshots or other detected audio events, and so forth). Additionally or alternatively, call characteristics can be used to identify one or more topics or purposes associated with a call. For example, topics or purposes might include certain emergency conditions, such as heart attacks, injuries or wounds, falls, car accidents, and so forth. Topics or purposes can further include, for example, people or objects, such as knives, guns, cars, animals, and so forth.

Any combination of the foregoing can be used to generate, by the call data module 210, one or more training datasets to train, by the call categorization module 220, a machine learning model to categorize received calls based on early call information. For example, a training dataset can include early call information and/or other call data associated with calls, identified characteristics of each call based on the early call information and/or other call data, identified topics or purposes based on the characteristics, and/or one or more categories associated with each call.

Call Categorization Module

The call categorization module 220 is configured and/or programmed to use early call information and/or other call data from the call data module 210 to train a machine learning model to categorize a received call using early call information. The call categorization module 220 receives one or more training datasets comprising early call information and/or other call data for calls each associated with one or more call categories. As described herein above, the training datasets can comprise early call information and/or other call information analyzed/processed to identify one or more characteristics associated with each call and one or more topics or purposes associated with each call. As described herein, the call characteristics can be expressed as variable values, such as count or frequency variables. For example, a training dataset can include a set of calls each associated with a call category and variable values that characterize the call based at least in part on early call information. A call category for a water-related emergency can be associated with one or more visual or audio characteristics expressed as variable values associated with one or more of caller body temperature, sounds and/or images associated with water, words detected in early call audio, and so forth.

The call categorization module 220 then uses the one or more training datasets to train one or more machine learning models to categorize a received call based at least in part on early call information. For example, a machine learning model can be trained to detect audio and/or visual call characteristics indicative of one or more call categories based on keywords or phrases, speaker characteristics (e.g., tone, pitch, speaking rate, sentiment, mood), non-verbal sounds or noises (e.g., gunshots, crashes, screams, cries, moans, animal sounds), and/or visible objects (e.g., people, vehicles, animals, weapons, wounds, injuries, etc.). As described herein, characteristics can also be detected based on other sensor data (e.g., from accelerometers, gyroscopes, touch-sensitive sensors, biometric sensors, photodiodes, thermometers, hygrometers, etc.). A machine learning model can also be trained to identify one or more topics or purposes associated with a call based on the foregoing call characteristics. Based on detected call characteristics and/or identified topics or purposes, the machine learning model is trained to categorize a received call based at least in part on early call information.

Categorizing a received call can be based on, for example, generating confidence scores (e.g., numerical scores) indicating a likelihood that early call information associated with a call is associated with one or more call categories. Confidence scores can be calculated based on call characteristics, identified topics or purposes, call data or metadata, or any combination thereof.

In some implementations, an initial confidence score can be calculated to identify a likely category for a received call based on early call information, and the initial confidence score can be adjusted as additional early call information or other call data is received. For example, early call information can be used to identify one or more likely call categories for a received call. Once the received call is routed to and accepted at a receiving device, further call data is received comprising at least call audio. While the call is occurring, the confidence score is adjusted based on the received call audio, which may include speech or other sounds received via the calling device and/or the receiving device, images or videos, sensor data, and so forth.

When one or more confidence scores exceeds a threshold (e.g., 70%, 80%, 90%, etc.), then the received call is determined to be associated with a corresponding call category. Thresholds can be determined in various ways and applied based on the needs of a particular implementation. For example, thresholds can be determined empirically and adjusted periodically and/or continuously based on ongoing data associated with categorized calls. In some implementations, the threshold is configurable by a user of the disclosed system. The one or more determined call categories can then be used, for example, to route the call to a receiving device (e.g., an appropriate emergency service to respond to an emergency condition) and/or to assign a relative priority for the call. For example, a received call is determined to be associated with call categories of active crime, violent crime, and injured person will be given a high relative priority and routed to an emergency service to provide immediate law enforcement and medical assistance. By contrast, a received call that is determined to be associated with a call category of non-urgent emergency or false report will be given a lower relative priority for response and/or routed to a different service that need not provide an immediate response.

In some implementations, the call categorization module 220 includes an ensemble machine learning model. For example, a set of machine learning models can be trained, each corresponding to a feature of call data and/or early call information. One or more machine learning models can be trained, for example, to categorize calls based on visual information (e.g., by recognizing objects). One or more other machine learning models can be trained to categorize calls based on audio information (e.g., keywords or phrases, topics or purposes, etc.). One or more other machine learning models can be trained to categorize calls based on other sensor data and/or other early call information, such as temperature data, accelerometer data, gyroscope data, biometric sensor data, device information, location information, and so forth. Any combination of the foregoing models can then be combined, and a model can be trained or configured to assign a respective weight to each model and categorize calls based on the combined models.

Additionally or alternatively, the call categorization module 220 can train/configure/store one or more models to categorize other kinds of communications, such as SMS, RCS, and/or text messages.

Reporting and Log Module

The reporting and log module 230 is configured and/or programmed to record information associated with received calls or other communications and associated early call information, such as categories associated with the communications. As the machine learning model trained by the call categorization module 220 is applied to received calls, the reporting and log module 230 records and reports information about the received calls. For example, the reporting and log module 230 can cause display at a receiving device to which a call is routed of call category information associated with the call and other information about the call, such as caller name, caller phone number, date and time information, call content information (e.g., call characteristics, call audio, etc.), and so forth. The reporting and log module 230 can also record the foregoing information in a database, and this information can be used to assess the trained machine learning model for calibration or retraining. For example, information recorded by the reporting and log module 230 can be assessed to determine whether calls are accurately categorized, and the information can be included in one or more training datasets to calibrate or retrain the machine learning model. This information can indicate, for example, that a certain caller or phone number is frequently associated with false reports, which would then affect how the machine learning model categorizes future calls from that caller or phone number (e.g., by increasing an associated confidence score for a call category for false reports).

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the call categorization module 220 can include a neural network with multiple input nodes that receive training datasets. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to assess likely categories for a received call, and so forth. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new call data.

Training of Machine Learning Model

Figure 3:
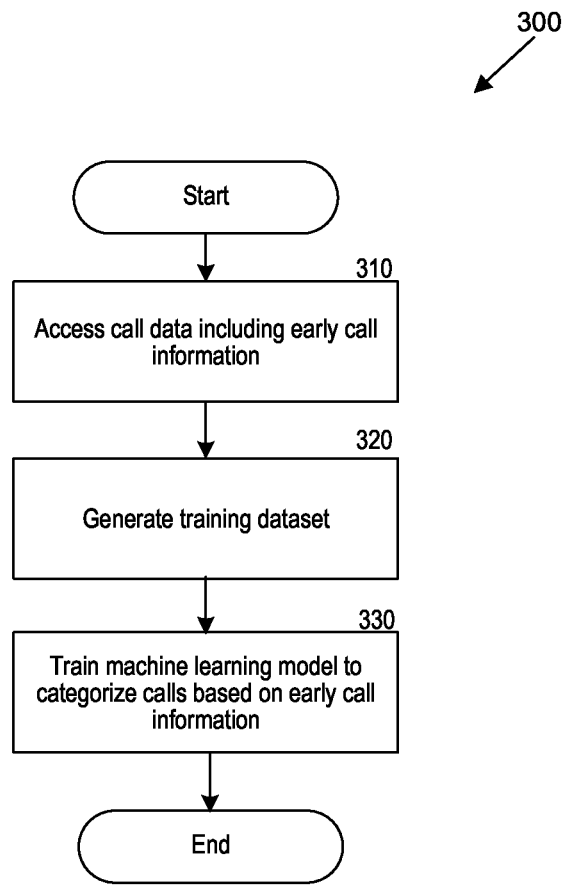
FIG. 3 is a flow diagram illustrating an example process for training a machine learning model to categorize calls using early call information.

FIG. 3 is a flow diagram illustrating a process 300 for training a machine learning model to categorize received calls using early call information.

The process 300 begins at block 310, where call data is received or accessed, including early call information, for multiple calls. The call data can be received/accessed/stored, for example, by the call data module 210 of FIG. 2, as described herein above. In some implementations, the received or accessed data relates to other kinds of communications (e.g., SMS, RCS, or text messages). Calls can include, for example, phone calls or video calls placed from various callers to call recipients. Call data includes early call information for at least a portion of the calls, such as audio information, visual information, and/or sensor or other data collected and/or received at any time before a call is accepted at a receiving device. In some implementations, the early call information is collected and/or received during call setup. In some implementations, the early call information is collected and/or received before final call routing. In some implementations, the early call information is collected during a predetermined time period before a call is routed and/or answered (e.g., one minute, five minutes, ten minutes, fifteen minutes, thirty minutes, one hour, etc.). Each received call in the call data is associated with one or more call categories.

The process 300 then proceeds to block 320, where a training dataset is created using the early call information and/or other call data. A training dataset can be created, for example, by the call data module 210 of FIG. 2, as described herein above. Generating the training dataset includes identifying one or more characteristics of calls based on corresponding early call information and/or other call data. Identifying call characteristics can include, for example, calculating one or more variables using the early call information or other call data. Furthermore, generating the training dataset can include identifying one or more topics or purposes associated with a call, for example, based on analysis of audio information and/or visual information included in early call information or other call data.

The process 300 then proceeds to block 330, where a machine learning model is trained using the training dataset generated at block 320. A machine learning model can be trained, for example, by the call categorization module 220 of FIG. 2. Based on the training, the machine learning model is then able to categorize received phone calls based, at least in part, on early call information, as described herein.

In some implementations, the process 300 can further include testing the machine learning model. For example, a portion of the call data (e.g., 10%) received or accessed at block 310 can be excluded from the training dataset and used as test data to assess the accuracy of the trained machine learning model. The trained machine learning model is applied to the test data to determine whether the model correctly categorizes calls based on early call information with an accuracy beyond a threshold level (e.g., 70% accurate, 80% accurate, 90% accurate, etc.). If the trained machine learning model does not exceed the threshold accuracy when applied to the test data then the model can be retrained or discarded in favor of a more accurate model.

Retraining the machine learning model can include training the model at least a second time using the same training dataset, training the model with a different (e.g., expanded) training dataset, applying different weights to a training dataset, rebalancing a training dataset, and so forth.

In some implementations, multiple machine learning models can be trained according to process 300, such as training an ensemble of machine learning models, as described herein above with reference to the call categorization module 220 of FIG. 2.

Categorizing Received Calls Using Early Call Information

Figure 4:
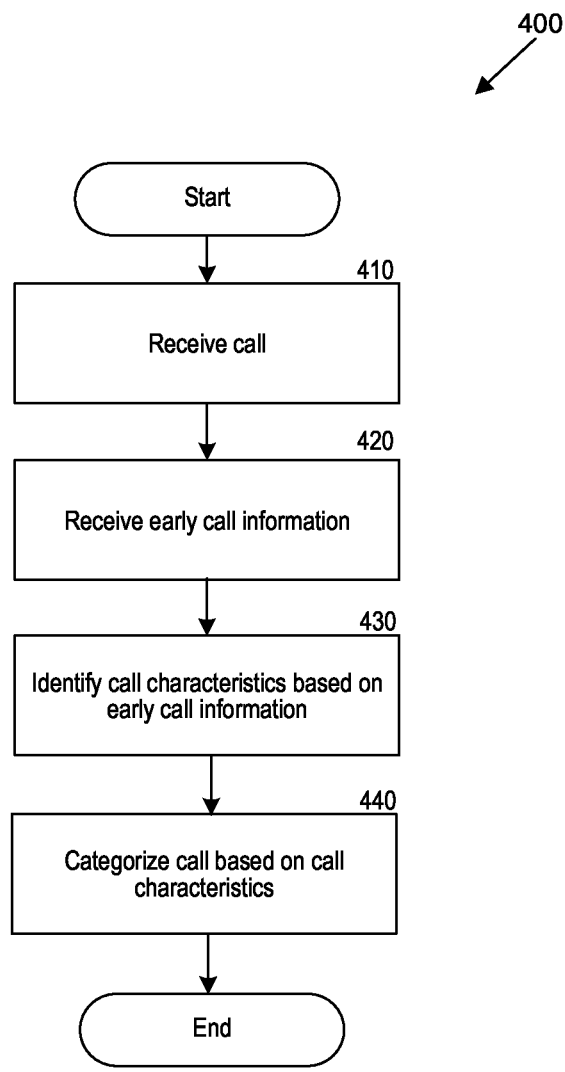
FIG. 4 is a flow diagram illustrating an example process for categorizing calls using early call information.

FIG. 4 is a flow diagram illustrating a process 400 for categorizing received calls using early call information. The process 400 or portions thereof can be performed, for example, using one or more machine learning models trained using the process 300 of FIG. 3. All or portions of the process 400 can be performed, for example, using the call categorization module 220 of FIG. 2.

The process 400 begins at block 410, where a call is received. The call can be received, for example, by the call categorization system and before routing the call to a receiving device. In some implementations, the call is received at a receiving device after call routing. The call is initiated by a caller at a calling device (e.g., a smartphone or other mobile device or phone). Receiving the call can include, for example, receiving an invite request pursuant to Session Initiation Protocol (SIP) signaling protocols or similar protocols for call initiation and setup.

The process 400 then proceeds to block 420, where early information is received associated with the call received at block 410. In some implementations, operations of block 410 and block 420 are performed in parallel, such that receiving the call includes receiving the early call information. The early call information comprises sensor data collected/transmitted via the calling device before the call is answered at a receiving device. In some implementations, the early call information is collected/transmitted before call routing. In some implementations, the early call information is collected/transmitted during call setup. The sensor data can include audio information collected via a microphone or other audio sensor of the calling device and/or visual information (e.g., one or more images or videos) collected via a camera or other visual sensor of the calling device. In some implementations, the sensor data includes data from one or more additional sensors, such as biometric sensors, motion-sensitive sensors (e.g., accelerometer or gyroscopes), touch-sensitive sensors (e.g., touchscreens), thermometers, hygrometers, photodiodes, and so forth. In some implementations, one or more of the foregoing sensors are included in an accessory device communicatively coupled to the calling device, such as a wearable device (e.g., smartwatch, smart glasses, clothing, medical devices, etc.). In some implementations, the early call information includes non-sensor information associated with a device.

The process 400 then proceeds to block 430, wherein one or more call characteristics are identified using the early call information. The one or more characteristics can be identified and/or expressed as one or more calculated variable values based on the early call information. The characteristics can be identified based on keywords or phrases in call audio, verbal or non-verbal content in audio information, visual characteristics in visual information (e.g., identified objects), and/or other data included in the early call information. Call characteristics can further be based on other call data, in combination with early call information, such as caller phone number, caller device information, caller name, caller location, and so forth. Identifying the call characteristics can further include identifying one or more topics or purposes of the call based on the early call information and/or other call data.

The process then proceeds to block 440, where the call is categorized based on the identified call characteristics. Categorizing the call can include identifying one more predetermined call categories associated with the call based on calculating confidence scores using the early call information and/or the call characteristics.

In some implementations, the process 400 further includes taking one or more actions based on the one or more categories determined for the call. For example, the one or more actions can include routing the call based on the call categories. In some implementations, metadata associated with a call can be enhanced with call categorization information, such as through a customized implementation of standard telephony protocols or as an out-of-band (e.g., parallel) protocol provided via the disclosed system. The one or more actions can, additionally or alternatively, including assigning a relative priority for the one or more calls, as compared to other calls, The relative priority corresponds to urgency and/or type of response to the call, such as the order in which the call should a answered relative to another call, the kinds of resources that will be made available to the caller, and so forth. The one or more actions can, additionally or alternatively, include causing display to a call recipient of call category information, such as determined call categories, confidence scores, topics/purposes/subjects associated with the call, suggested responses to the call (e.g., emergency response resources), color-coded notices associated with the call (e.g., red for urgent needs, orange for intermediate needs, yellow for low-priority, etc.), and so forth. Additionally or alternatively, call categories and/or relative priorities can be used to provision one or more resources needed to respond to the call, such as emergency response resources. In some implementations, provisioning of these resources can be triggered automatically based on call category and/or relative priority of a call.

In some implementations, the process 400 can further include adjusting the call categorization based on ongoing call data, for example, call audio and/or other sensor data received after the call is answered. In these and other implementations, the adjusted call categorization data can be used to adjust a corresponding response to the call, such as by suggesting that a call be re-routed, modifying a suggested response and/or relative priority for the call, and/or causing display of updated categorization information to a recipient of the call.

Figure 5:
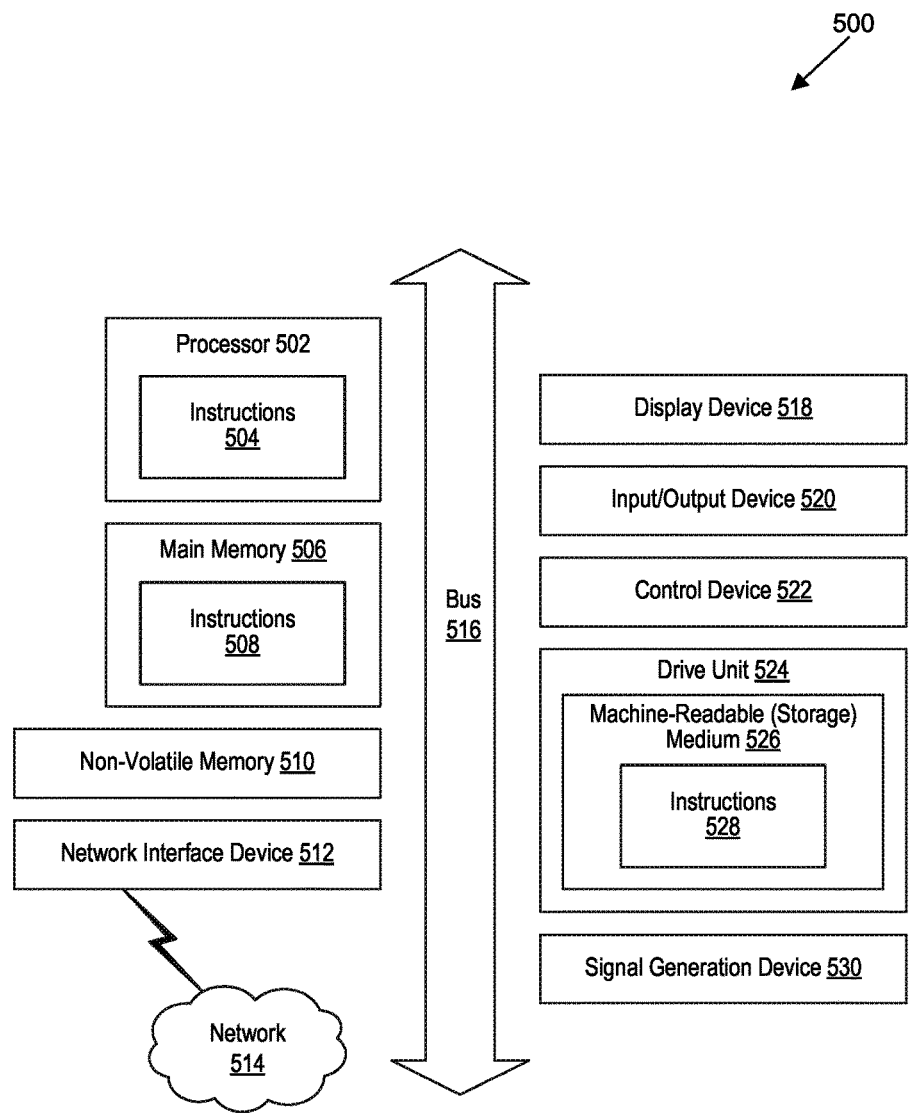
FIG. 5 is a block diagram illustrating an example of a computing system in which at least some operations described herein can be implemented.

All or portions of processes 300 and 400 can be performed in any order, including performing one or more operations in parallel. Additionally, operations can be added to or removed from processes 300 and 400 without deviating from the teachings of the present disclosure Computer System FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one computer-readable medium, excluding transitory signals and carrying instructions that, when executed by at least one processor of a computing system, cause the computing system to perform operations to categorize a received call, the operations comprising:
   receive, at a network server, from a calling device, a call;
   receive, at the network server, before acceptance of the call, early call information,
      wherein the early call information is different from the call, and
      wherein the early call information includes audio information, visual information, or both, associated with the calling device;
   identify, at the network server, based at least in part on the early call information, at least one call characteristic of the received call,
      wherein the at least one call characteristic includes a purpose or topic associated with the received call, and
      wherein the at least one call characteristic is identified based on identifying a keyword or phrase in the audio information, or identifying an object in the visual information, or both;
   determine, at the network server, a category of the received call using the at least one call characteristic of the received call,
      wherein the category of the received call is selected from a set of call categories including at least one emergency call category and at least one non-emergency call category;
   assign, at the network server, a relative priority of the received call based on the determined category of the received call,
      wherein the relative priority of the received call prioritizes the received call for response relative to at least one other call; and
   generate, at the network server, based on the relative priority and the determined category, a suggested response for the call.

2. The at least one computer-readable medium of claim 1, wherein the operations further comprise:
route the received call to a receiving device,
wherein the receiving device is selected from a set of receiving devices based on the determined category of the call, the assigned relative priority of the call, the suggested response for the call, or any combination thereof.

3. The at least one computer-readable medium of claim 1, wherein the early call information includes sensor data collected via the calling device before or during Session Initiation Protocol (SIP) call setup or device information associated with the calling device.

4. The at least one computer-readable medium of claim 1:
wherein the early call information includes sensor data collected via the calling device or a wearable device associated with the calling device; and
wherein the sensor data includes data associated with at least one of: an accelerometer, a gyroscope, a thermometer, a hygrometer, or a photodiode.

5. The at least one computer-readable medium of claim 1, wherein the at least one call characteristic is identified based at least in part on determining a sentiment or mood of a caller.

6. The at least one computer-readable medium of claim 1, wherein determining the category of the received call causes the computing system to:
calculate at least one confidence score based on the at least one call characteristic and the early call information,
wherein the at least one confidence score indicates a likelihood that the received call corresponds to a call category, and
wherein the early call information includes sensor data from multiple sensors associated with the calling device; and
compare the at least one confidence score to a threshold score,
wherein, when the at least one confidence score exceeds the threshold score, a category corresponding to the at least one confidence score is determined.

7. The at least one computer-readable medium of claim 1:
wherein the early call information includes at least one photo or video collected via the calling device and audio information collected via the calling device; and
wherein identifying the at least one call characteristic causes the computing system to apply a trained machine learning model to the at least one photo or video and the audio information to identify the purpose or topic associated with the received call.

8. A computer-implemented method to categorize a received call, the method comprising:
receiving, at a network server, from a calling device, a call;
receiving, at the network server, before acceptance of the call, early call information,
wherein the early call information is different from the call, and
wherein the early call information includes audio information, visual information, or both, associated with the calling device;
identifying, at the network server, based at least in part on the early call information, at least one call characteristic of the received call,
wherein the at least one call characteristic includes a purpose or topic associated with the received call;
determining, at the network server, a category of the received call using the at least one call characteristic of the received call; and
assigning, at the network server, a relative priority of the received call based on the determined category of the received call,
wherein the relative priority of the received call prioritizes the received call for response relative to at least one other call.

9. The computer-implemented method of claim 8, wherein the early call information includes sensor data collected via the calling device before or during Session Initiation Protocol (SIP) call setup.

10. The computer-implemented method of claim 8, wherein determining the category of the received call includes selecting the category from a set of predetermined call categories including emergency and non-emergency call categories.

11. The computer-implemented method of claim 8:
wherein the early call information includes sensor data collected via the calling device or a wearable device associated with the calling device; and
wherein the sensor data includes data associated with at least one of: an accelerometer, a gyroscope, a thermometer, a hygrometer, or a photodiode.

12. The computer-implemented method of claim 8:
wherein the early call information includes at least one photo or video collected via the calling device and audio information collected via the calling device; and
wherein identifying the at least one call characteristic includes applying a trained machine learning model to the at least one photo or video and the audio information to identify the purpose or topic associated with the received call.

13. The computer-implemented method of claim 8, wherein the at least one call characteristic is identified based on detecting at least one keyword or phrase in the early call information or determining a sentiment or mood of a caller.

14. The computer-implemented method of claim 8, further comprising:
receiving, from the calling device, additional call information associated with the received call;
determining, based on the additional call information and the early call information, a different category of the received call; and
modifying the assigned relative priority of the received call based on the different category of the received call.

15. A computing system comprising:
at least one hardware processor; and
at least one non-transitory memory carrying instructions that, when executed by the at least one hardware processor, cause the computing system to perform operations comprising:
access, at a network server, call data for a set of calls,
wherein the call data includes, for at least a subset of the set of calls, early call information associated with each call in the subset of calls,
wherein the early call information includes, for each call in the subset of calls, audio information, visual information, or both collected via a calling device that initiated the call and before acceptance of the call by a receiving device, and
wherein the call data includes at least one category for each call in the subset of calls;
generate, at the network server, using the call data from the subset of calls, a training dataset, wherein the computing system is further caused to identify at least one call characteristic of each call in the subset of calls based on the early call information of the call, and wherein the at least one call characteristic includes a topic or purpose associated with the call; and train, at the network server, using the generated training dataset, a machine learning model to categorize one or more received calls based, at least in part, on early call information associated with the one or more received calls.

16. The computing system of claim 15:

wherein the call data includes early call information comprising at least one photo, at least one video, or both, collected via calling devices or accessory devices associated with calling devices;

wherein generating the training dataset causes the computing system to identify a call characteristic based on the early call information comprising the at least one photo, the at least on video, or both; and wherein training the machine learning model causes the computing system to train the machine learning model to categorize the one or more received calls based on photos, videos, or both.

17. The computing system of claim 15:

wherein the call data includes early call information collected via calling devices or accessory devices associated with calling devices, the early call information comprising sensor data associated with at least one of: an accelerometer, a gyroscope, a thermometer, a hygrometer, or a photodiode;

wherein generating the training dataset causes the computing system to identify a call characteristic based on the early call information comprising the sensor data; and wherein training the machine learning model causes the computing system to train the machine learning model to categorize the one or more received calls based on received sensor data.

18. The computing system of claim 15, wherein the call data includes early call information comprising sensor data collected via the calling device before or during Session Initiation Protocol (SIP) call setup.

19. The computing system of claim 15, wherein the at least one call characteristic is identified based on detecting a keyword or phrase in the audio information and detecting an image in the visual information.

20. The computing system of claim 15, wherein categorizing the received call based at least in part on the early call information associated with the received call further causes the computing system to assign a relative priority of the received call, route the received call to the receiving device, determine a suggested response to the received call, or any combination thereof.

* * * * *